No. 828,736. PATENTED AUG. 14, 1906.
P. D. GWALTNEY.
PEANUT STEMMING MACHINE.
APPLICATION FILED FEB. 2, 1906.
3 SHEETS—SHEET 2.
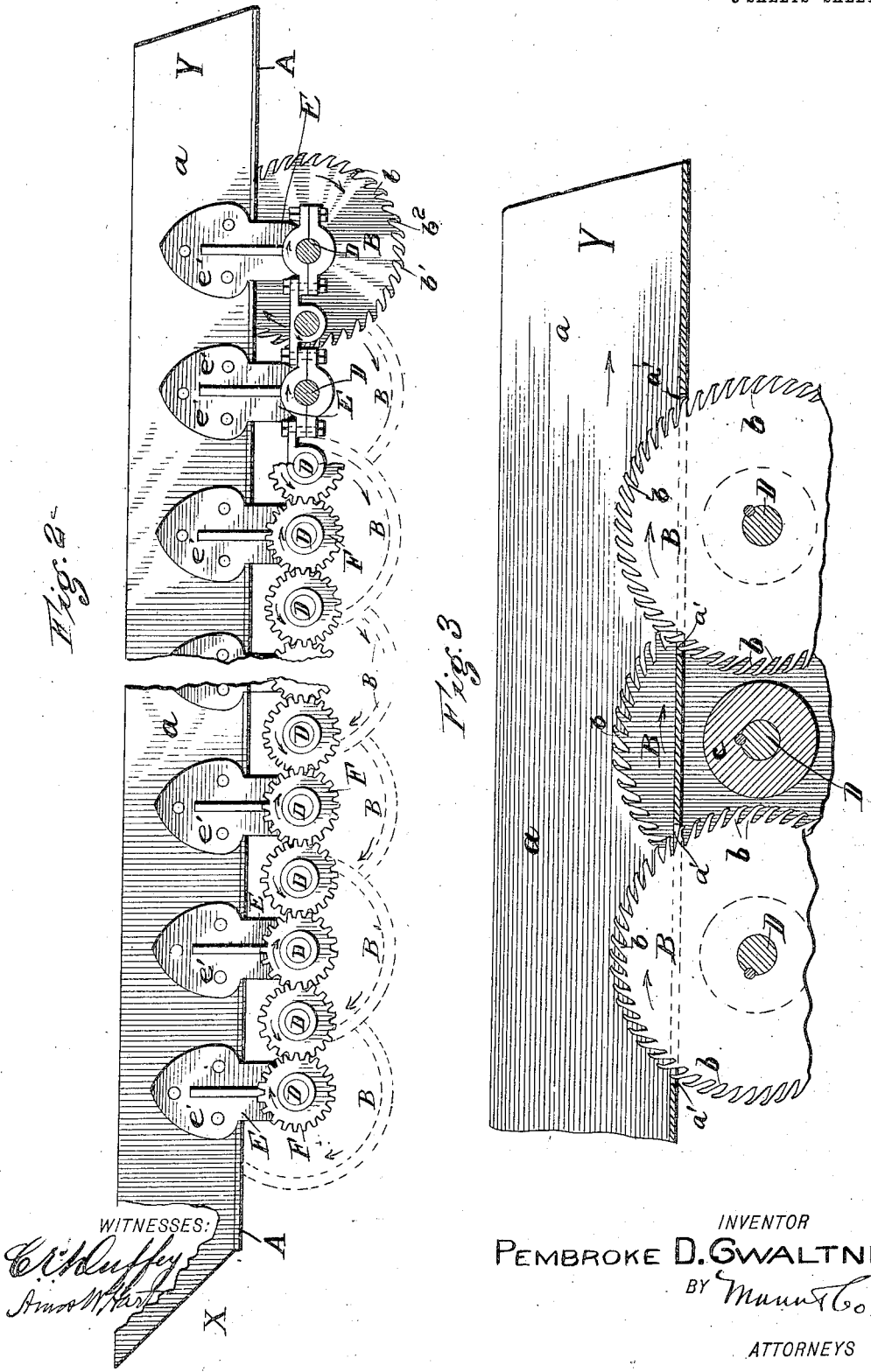
INVENTOR
PEMBROKE D. GWALTNEY
BY Munn & Co.
ATTORNEYS No. 828,736. PATENTED AUG. 14, 1906.
P. D. GWALTNEY.
PEANUT STEMMING MACHINE.
APPLICATION FILED FEB. 2, 1906.

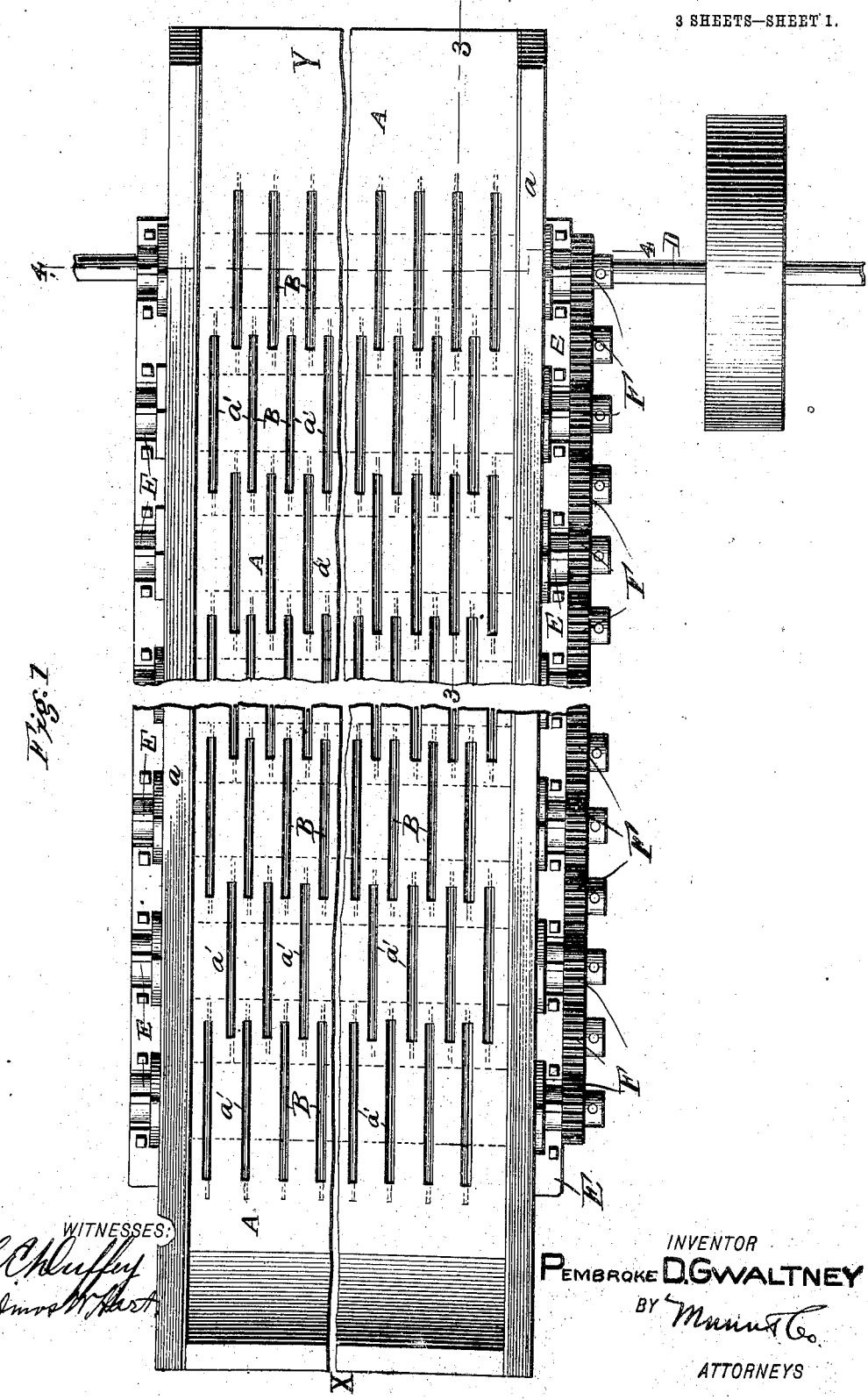

3 SHEETS—SHEET 3.

WITNESSES:

INVENTOR
PEMBROKE D. GWALTNEY
BY
ATTORNEYS

UNITED STATES PATENT OFFICE.

PEMBROKE D. GWALTNEY, OF SMITHFIELD, VIRGINIA.

PEANUT-STEMMING MACHINE.

No. 828,736.      Specification of Letters Patent.      Patented Aug. 14, 1906.

Application filed February 2, 1906. Serial No. 299,161.

*To all whom it may concern:*

Be it known that I, PEMBROKE D. GWALTNEY, a citizen of the United States, and a resident of Smithfield, in the county of Isle of Wight and State of Virginia, have invented an Improved Peanut-Stemming Machine, of which the following is a specification.

The roots or stems adhering to peanuts as dug from the ground require to be removed preliminary to storage, transportation, or preparation for the market, and this is ordinarily done by hand, which is a slow, laborious, and expensive operation. I have devised and put in successful commercial use a simple machine which performs the work effectively, quickly, and cheaply, without injury to the peanuts themselves.

The construction, combination, and operation of parts composing said machine are hereinafter described, and the novel features embodying my invention are specifically indicated.

Figure 4:
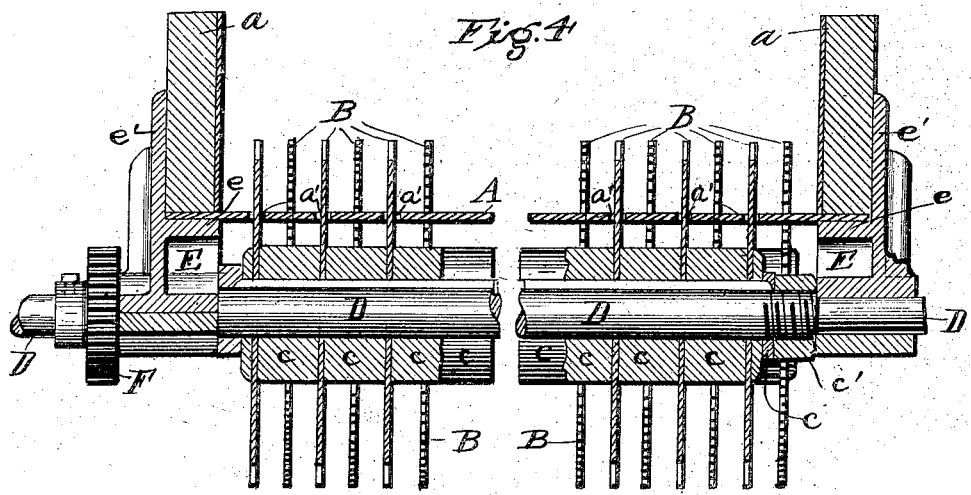
Figure 5:
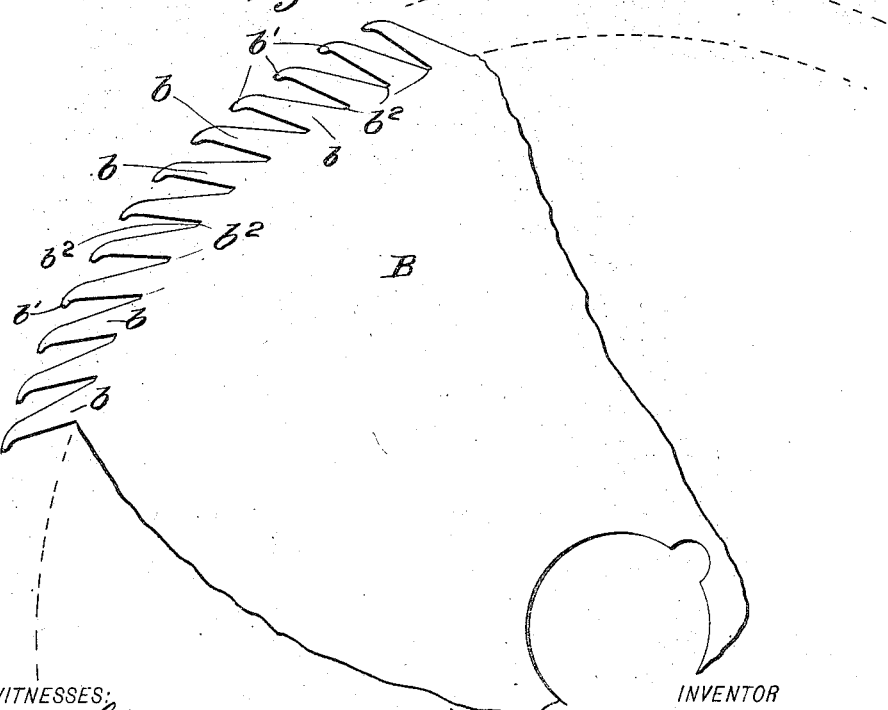

In the accompanying drawings, Figure 1 is a plan view of the machine. Fig. 2 is a side view of the same. Fig. 3 is a longitudinal vertical section on line 3 3 of Fig. 1. Fig. 4 is a vertical cross-section on the line 4 4 of Fig. 1. Fig. 5 is an enlarged side view of one of the toothed disks or stemmers proper.

A indicates a bed or plane surface over which the peanuts are passed to be stemmed, and $a$ indicates the vertical longitudinal sides of the same, the two thus forming practically a trough-shaped guideway. The bed A is provided with a series of transverse rows of vertical slots $a'$, the same being shown arranged so that the slots of one row are "staggered" with relation to those of adjoining rows, or, in other words, are so arranged as to be opposite the spaces which intervene the slots of adjoining rows. Further, the slots of one row extend into the spaces of an adjoining row, the several slots thus overlapping, as will be readily understood by reference to Fig. 1. The stemmers proper are toothed disks B, (see Figs. 3 and 4,) the same being mounted upon transverse shafts D, which are arranged parallel and horizontal beneath the bed A. The upper portions or segments of the several disks project through the aforesaid slots $a'$, as indicated in Figs. 2 and 3. The disks are clamped and secured upon their several shafts by means of collars $c$ and nuts $c'$, working on the threaded portions of the shafts, as will be readily understood by reference to Fig. 4. The shafts D have their bearings in the side portions of the metal framework E, which, as shown in Fig. 4, is provided with inwardly-projecting horizontal flanges $e$ and with vertical flanges $e'$, which support the sides $a$ of the guideway. The bed A is preferably formed of a metal plate, and the inner sides of the vertical parts $a$ are covered with smooth sheet metal, so that friction of the peanuts in passing through the guideway is reduced to a minimum. As shown in Fig. 2, each shaft D is provided at one end, exterior to the frame E, with a spur-gear F, which is keyed or clamped in place in the usual manner. One of the end shafts of the series is extended, as indicated in Fig. 1, and provided with a driving-pulley or other device for suitable connection with a motor, and by this means rotation at uniform speed is imparted to all the toothed disks of the several gangs or series. The entrance end of the guideway is indicated by X, and the exit end by Y. The direction of rotation of the several series of disks is indicated by arrows. In other words, the upper segments of the disks which project above the bed-plate A travel in the direction toward the exit end. The teeth $b$ of the several disks engage the stems of the peanuts and drag them down through the slots; and it is manifest that in this operation the nuts are fed or moved forward toward the end Y of the guideway. The inclination or angle of the teeth $b$ is therefore important, since it obviates the necessity of inclining the bottom or bed A of the guideway or the employment of supplemental means to feed the peanuts from X to Y. The bed-plate A and all its attachments may, however, be arranged at an angle or downward inclination to facilitate the forward feed or travel of the peanuts by the effect of gravity.

The form and arrangement of the teeth $b$ of the several stemmers B is best illustrated in Fig. 5. As there shown, they are inclined at an acute angle to radii of the disks and are made practically wedge-shaped or tapered from the base to the extremity, where they are rounded slightly on the longer side and terminate in an offset or hook $b'$. It is highly important that this hook shall be rounded or blunted in order that it may not pierce or otherwise injure the peanut pods or shells and still take the required hold on the stems. The sides of the body of the teeth are straight and instead of a sharp angle being formed between them at the gullet or throat $b^2$ the latter is broadened and made rounded or straight for the purpose of preventing the peanut-stems wedging and choking in the throat, as they would otherwise be liable to do. In other words, the width of the throat or gullet is made equal to the usual diameter of a peanut-stem, so that the latter may escape freely therefrom in case of lodgment. It will be understood, however, that this lodgment or release is favored by the centrifugal action of the disks. It is apparent that the special form and inclination of the teeth $b$ enables them to take hold of the peanut-stems and carry them forward and drag them down through the slots, the same discharging from the lower sides of the disk as the latter rotates. It will be understood that the points $b'$ and, in fact, the entire shorter sides of the teeth $b$ are blunted, so as to avoid cutting the stems.

The staggered arrangement or the overlapping of the slots and disks, as before described and indicated in Fig. 1, insures the contact of the disks with the peanut-stems passing through one channel or space between the disks and into the succeeding spaces, the course of the peanuts being thus practically zigzag. In this manner is insured due action of the toothed disks on all of the stems, and therefore the practically perfect removal of the stems.

By practical test I have found that the upper portions or segments of the stemmers B should extend from three-fourths of an inch to three or more inches above the bottom plate A, as required by the work to be done and the desired capacity of the machine. It is to be understood that if sufficient pitch or inclination were given to the bed-plate it would be possible to cause the nuts to travel in a direction opposite to the rotation of the disks.

I do not of course restrict my invention absolutely to the stemming of peanuts, as it may be applied for analogous purposes.

While the several shafts upon which the toothed disks are mounted are geared together, as described, it is apparent that bevel-gears or chain and sprocket-wheels or various other means may be employed for rotating the shafts.

What I claim is—

1. In a machine for the purpose specified, the combination, with a guideway including sides and the bed-plate provided with a series of longitudinal slots, of a corresponding series of disks projecting through the slots, and above the bed-plate, a series of shafts arranged beneath the bed-plate upon which the disks are mounted, and means for revolving the same, the several disks being provided with peripheral teeth which are inclined to radii of the respective disks and in the direction of required travel of the peanuts over the bed-plate, the outer ends of the teeth being blunt and curved, or slightly extended in the direction of the inclination, thus forming a blunt and rounded hook, as and for the purpose specified.

2. In a machine for the purpose specified, the combination, with a bed-plate having a series of transverse rows of longitudinal slots, vertical sides arranged parallel to form a guideway, and metal frame-pieces having horizontal and vertical flanges for attachment and support of the said bed-plate and sides, the lower portions of said frame being provided with bearings, transverse shafts arranged in such bearings beneath the slotted bed-plate, a series of toothed disks mounted on the shafts and projecting through and above the slots of the bed-plate, and spur-gears mounted on said shafts and idlers interposed between the gears for imparting rotation to the shafts in the same direction, as described.

3. The improved peanut-stemmer, consisting of a disk having peripheral teeth which are inclined to radii of the disk, the same being tapered from the base outward, their opposite edges being straight and the outer ends rounded and projecting slightly on the shorter side to adapt them to engage and hold the stems in the manner described.

PEMBROKE D. GWALTNEY.

Witnesses:
H. S. BAKER,
GEO. D. DEY.